(12) United States Patent
Belfer et al.

(10) Patent No.: US 10,237,156 B2
(45) Date of Patent: Mar. 19, 2019

(54) LOW-COMPLEXITY MEASUREMENT OF PACKET TRAVERSAL TIME IN NETWORK ELEMENT

(71) Applicant: Mellanox Technologies TLV Ltd., Raanana (IL)

(72) Inventors: Oded Belfer, Tel Aviv (IL); George Elias, Tel Aviv (IL); Gil Levy, Hod Hasharon (IL)

(73) Assignee: Mellanox Technologies TLV Ltd., Raanana (IL)

( * ) Notice: Subject to any disclaimer, the term of this patent is extended or adjusted under 35 U.S.C. 154(b) by 84 days.

(21) Appl. No.: 15/361,528

(22) Filed: Nov. 28, 2016

(65) Prior Publication Data
US 2018/0152365 A1 May 31, 2018

(51) Int. Cl.
*H04L 12/26* (2006.01)
(52) U.S. Cl.
CPC ........ *H04L 43/0894* (2013.01); *H04L 43/106* (2013.01)
(58) Field of Classification Search
None
See application file for complete search history.

(56) References Cited

U.S. PATENT DOCUMENTS

| | | | | |
|---|---|---|---|---|
| 7,483,442 B1* | 1/2009 | Torudbaken | ............ | H04L 49/15 370/360 |
| 2006/0245454 A1* | 11/2006 | Balasubrannanian | ........................ | H04J 3/0673 370/509 |
| 2009/0259749 A1* | 10/2009 | Barrett | ................ | G06F 11/3495 709/224 |
| 2014/0269379 A1* | 9/2014 | Holbrook | ............ | H04L 43/0882 370/252 |

* cited by examiner

*Primary Examiner* — Nicholas Sloms
(74) *Attorney, Agent, or Firm* — Kligler & Associates

(57) ABSTRACT

A network element includes multiple interfaces and circuitry. The interfaces are configured to connect to a communication system. The circuitry is configured to receive via an ingress interface a packet that includes an Error Detection Code (EDC) field including an input EDC value, to determine an input timestamp indicative of a time-of-arrival of the received packet at the network element, and overwrite at least part of the input EDC value in the EDC field of the packet with the input timestamp, to estimate for the packet a traversal latency between reception at the ingress interface and transmission via a selected egress interface, based at least on the input timestamp, and to produce a deliverable version of the packet by writing an output EDC value to the EDC field, and send the deliverable version of the packet via the selected egress interface.

14 Claims, 3 Drawing Sheets

LOW-COMPLEXITY MEASUREMENT OF PACKET TRAVERSAL TIME IN NETWORK ELEMENT

TECHNICAL FIELD

Embodiments described herein relate generally to communication systems, and particularly to methods and systems for measuring traversal latency in network elements.

BACKGROUND

Network elements in various communication networks are required to measure the traversal latency of traffic through each network switch or router. The latency information gathered can be used, for example, in managing and optimizing the network performance.

Methods for measuring the traversal latency in a network element are known in the art. For example, U.S. Pat. No. 7,483,442, whose disclosure is incorporated herein by reference, describes an Infiniband switch that can have an input port logic unit for determining an output virtual lane for a received packet and for storing a descriptor of the determined output virtual lane in a packet field not protected by a checksum field of the packet. The switch can also have a routing unit for transferring the received packet to an output port corresponding to the determined output virtual lane. Additionally, the switch can have an output port logic unit for simultaneously checking the integrity of the packet transferred through the routing unit and calculating a new value for the checksum with the descriptor moved to a correct packet field, which field is included in the calculation of the checksum.

SUMMARY

An embodiment that is described herein provides a network element, including multiple interfaces and circuitry. The interfaces are configured to connect to a communication system. The circuitry is configured to receive via an ingress interface a packet that includes an Error Detection Code (EDC) field including an input EDC value, to determine an input timestamp indicative of a time-of-arrival of the received packet at the network element, and overwrite at least part of the input EDC value in the EDC field of the packet with the input timestamp, to estimate for the packet a traversal latency between reception at the ingress interface and transmission via a selected egress interface, based at least on the input timestamp, and to produce a deliverable version of the packet by writing an output EDC value to the EDC field, and send the deliverable version of the packet via the selected egress interface.

In some embodiments, the network element includes a switch in an Infiniband network, the EDC field includes a Variant Cyclic Redundancy Check (VCRC) field, and the circuitry is configured to evaluate an EDC value over the received packet, and to produce the output EDC value over the packet to be sent, in accordance with an Infiniband specification. In other embodiments, the input timestamp requires a storage space larger than the EDC field, and the circuitry is configured to overwrite the at least part of the input EDC value by allocating for the received packet a storage space larger than required for storing the received packet with the EDC field. In yet other embodiments, the circuitry is configured to estimate the traversal latency, by determining an output timestamp indicative of a time-of-departure of the packet to the communication system via the selected egress interface, and calculating a difference between the output timestamp and the input timestamp.

In an embodiment, in routing the packet, the circuitry is configured to change a value of a given field in the packet, and to evaluate the output EDC value after the given field has been changed. In another embodiment, the given field includes a Virtual lane (VL) field in accordance with an Infiniband specification. In yet another embodiment, the circuitry is configured to derive a histogram of traversal latencies from multiple packets received via ingress interfaces of the network element, and to update the histogram using the estimated traversal latency of the packet.

There is additionally provided, in accordance with an embodiment that is described herein a method including, receiving via an ingress interface of a network element that includes multiple interfaces for connecting to a communication system, a packet that includes an Error Detection Check (EDC) field including an input EDC value. An input timestamp indicative of a time-of-arrival of the received packet at the network element is determined, and at least part of the input EDC value in the EDC field of the packet is overwritten with the input timestamp. A traversal latency between reception at the ingress interface and transmission via a selected egress interface is estimated for the packet, based at least on the input timestamp. A deliverable version of the packet is produced by writing an output EDC value to the EDC field, and the deliverable version of the packet is sent via the selected egress interface.

These and other embodiments will be more fully understood from the following detailed description of the embodiments thereof, taken together with the drawings in which:

DETAILED DESCRIPTION OF EMBODIMENTS

Overview

Figure 1:
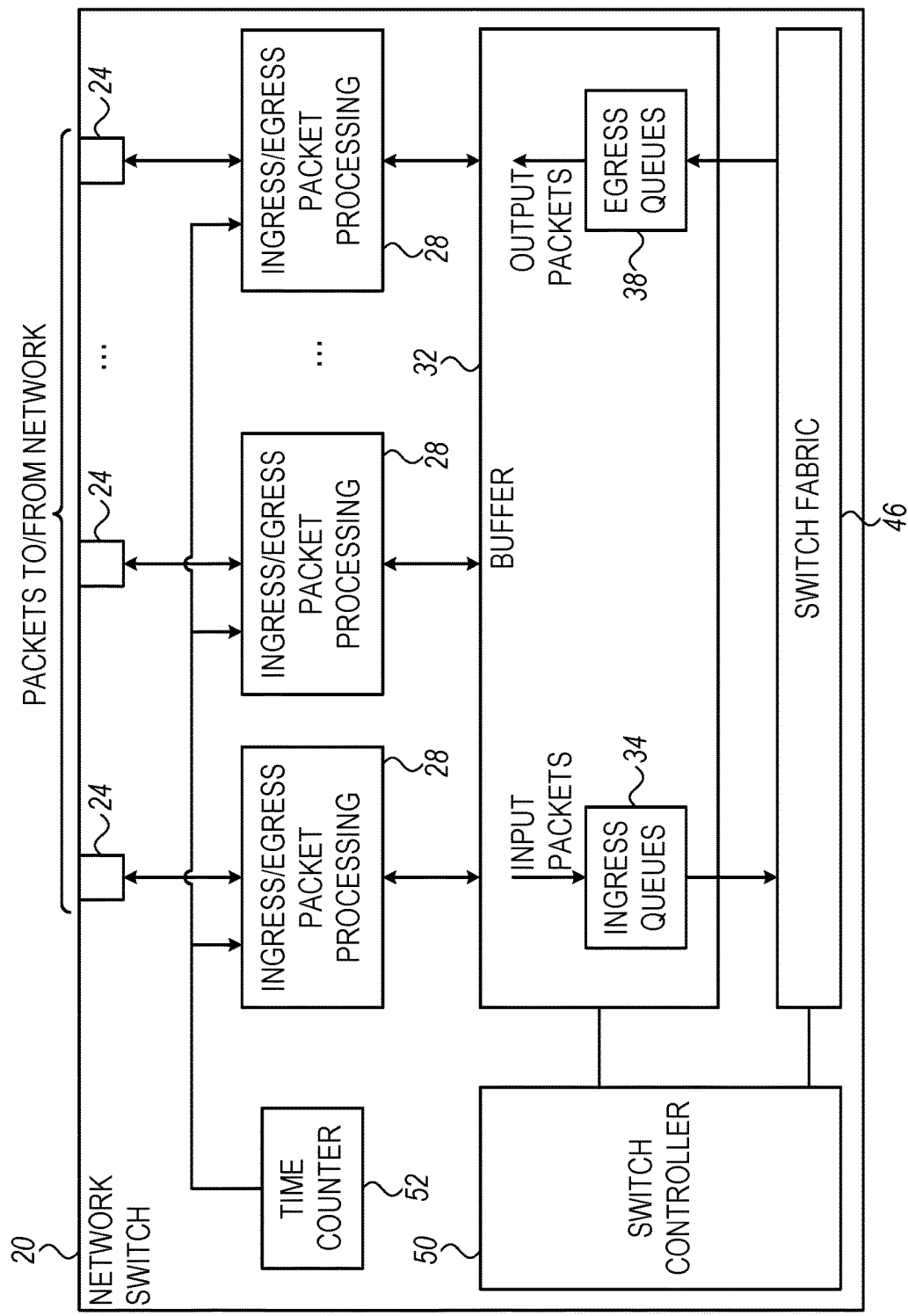
FIG. 1 is a block diagram that schematically illustrates a network switch supporting latency measurements, in accordance with an embodiment that is described herein.

The delivery time of traffic along a route in a communication network depends on the latency contributed by each of the network elements traversed by the traffic. Some communication networks rely on real-time measurements of the traversal latency within individual network elements for detecting performance bottlenecks and fault conditions, managing the network and optimizing the network performance.

The latency contributed by a switch can be deduced from the individual latencies measured over a large number of packets flowing through the switch. In principle, to estimate the traversal latency of one packet, a switch can record the time in which the packet arrives at the switch and the time of sending the packet back to the network, and take the time difference. This approach, however, requires a large storage space because the switch needs to record the arrival time of each individual packet until the packet is sent to the network.

In addition, since different packets may undergo different delays, e.g., based on packet priority, the logic required for coordinating the time and latency measurements is relatively complex, and consumes large amounts of chip area and power.

In the description that follows the packet traversal latency is also referred to as "packet latency" for brevity.

Embodiments that are described herein provide improved methods and systems for measuring traversal latency within a network element (e.g., a switch). In the disclosed techniques, the switch saves an indication of the packet's time of arrival in a field of the packet header that is normally used for data integrity verification. Since this dual use requires little or no extra storage space, the overall storage area is reduced significantly. Moreover, buffering and routing the packet that includes the time measurement employs existing processing paths within the switch, which simplifies the logic required for measuring packet latency, and therefore reduces chip area and power consumption.

In some embodiments, the packet field that is used for data integrity verification comprises an Error Detection Code (EDC) such as, for example, a Cyclic Redundancy Check (CRC). For example, in Infiniband (IB) networks, the EDC field comprises a Variant Cyclic Redundancy Check (VCRC) in accordance with the Infiniband specifications.

The arrival and transmission times of the packet are typically measured by the switch and represented using respective input and output timestamps. In some embodiments, the switch overwrites at least part of the EDC value in the EDC field of the packet with the input timestamp. In case the input timestamp is larger than the EDC field, extra space is allocated for the packet to accommodate the extra bits. When the packet is scheduled for transmission, the switch estimates the packet latency by determining the output timestamp and calculating the difference between the output and input timestamps.

In an embodiment, routing the packet within the switch changes the value of a given field in the packet, e.g., a Virtual Lane (VL) field in Infiniband. In such an embodiment, the switch re-evaluates the EDC value after the given field has been changed, and writes it to the EDC field.

In some embodiments, the switch is configured to calculate a statistical property of the traversal latencies e.g., a histogram, based on the traversal latencies of multiple packets. The switch updates the histogram, on the fly, using the estimated traversal latencies of one or more packets flowing through the switch.

System Description

FIG. 1 is a block diagram that schematically illustrates a network switch 20 supporting latency measurements, in accordance with an embodiment that is described herein. Switch 20 may be a building block in any suitable communication network such as, for example, an InfiniBand (IB) switch fabric, or packet networks of other sorts, such as Ethernet or Internet Protocol (IP) networks. Alternatively, switch 20 may be comprised in a communication network that operates in accordance with any other suitable standard or protocol. Typically, multiple network elements such as switch 20 interconnect to build a communication network.

Although in the description that follows we mainly refer to a network switch, the disclosed techniques are applicable to other suitable types of network elements such as, for example, a router, bridge, gateway, or any other suitable type of network element.

In the present example, switch 20 comprises multiple ports 24 for exchanging data packets over the network. In some embodiments, a given port 24 functions both as an ingress interface for incoming packets and as an egress interface for outgoing packets. Alternatively, a port 24 can function as either ingress or egress interface. A port functioning as an ingress interface for incoming packets or as an egress interface for outgoing packets is also referred to herein respectively as an "ingress port" or an "egress port."

In the context of the present patent application and in the claims, the term "packet" is used to describe the basic data unit that is routed through the network. Different network types and communication protocols use different terms for such data units, e.g., packets, frames or cells. All of these data units are regarded herein as packets.

Packets that are exchanged via ports 24 are processed using ingress/egress processing modules 28. In the configuration of FIG. 1, each port has a dedicated packet processing module 28. In alternative embodiments, however, configurations in which a single packet processing module 28 serves multiple ports 24 can also be used.

Packet processing module 28 applies to incoming packets various ingress processing tasks, such as verifying the integrity of the data in the packet, packet classification and prioritization, access control and/or routing. Packet processing module 28 typically checks certain fields in the packets headers for these purposes. The header fields comprise, for example, addressing information, such as source and destination addresses and port numbers, and the underlying network protocol used. Other header fields include, for example, an EDC field for verifying data integrity, and a Virtual Lane (VL) field as will be described below. Packet processing module 28 additionally applies egress processing to packets that are about to be sent to the network, for example, by estimating for each packet a respective traversal latency within the switch, as will be described in detail below.

Switch 20 comprises a buffer 32, which comprises one or more ingress queues 34 for storing packets arriving from the network via the ingress interfaces of ports 24, and one or more egress queues 38 for storing packets awaiting transmission to the network via the egress interfaces of ports 24. In some embodiments, buffer 32 comprises a shared buffer in which queues of different sizes may be dynamically allocated to different ingress or egress interfaces, or in accordance with any other suitable criterion.

Switch 20 further comprises a configurable switch fabric 46, which forwards packets between ingress ports and egress ports, typically via respective ingress and/or egress queues, in accordance with a routing plan. In an embodiment, the routing plan is predefined. In another embodiment, the routing plan may update adaptively, e.g., based on network conditions. Fabric 46 may be implemented using any suitable method, such as, for example, applying to the packets routing rules. In some embodiments, buffer 32 (or another memory of the switch) stores packet descriptors (not shown in the figure) for managing the ingress queues and egress queues. The descriptors may hold information such as packet location in the queue, packet size, and the like.

Switch 20 comprises a switch controller 50, which performs the various management functions of switch 20. For example, switch controller 50 configures fabric 46 to apply the desired routing plan. By controlling the routing plan, switch 20 is able to cause the packets to traverse various routing paths through the network. In some embodiments, switch controller 50 detects, using the estimated packet latencies, fault conditions and performance bottlenecks such as congestion. The switch controller may also report the packet latencies or statistical properties thereof to a central network management appliance over the communication network.

Switch 20 comprises a counter 52 that is used for time measurements. In some embodiments, counter 52 comprises a 32-bit counter. The counter can be clocked at several selectable rates, e.g., a clock cycle between 1 ns and 16 ns. In general, accurate time measurements require a short clock cycle. In some embodiments, depending on the expected lifetime of the switch, the switch is configured to the shortest clock cycle that causes no wraparound counting. To estimate the packets traversal latencies, packet processing modules 28 read or query time counter 52 when the packets arrive at the switch and when the packets are transmitted to the network.

In some embodiments, counter 52 is implemented as multiple counters, e.g., a dedicated counter per port 24. In such embodiments, the dedicated counters are synchronized to a common reference.

Efficient Measurement of Packet Traversal Latency

Figure 2:
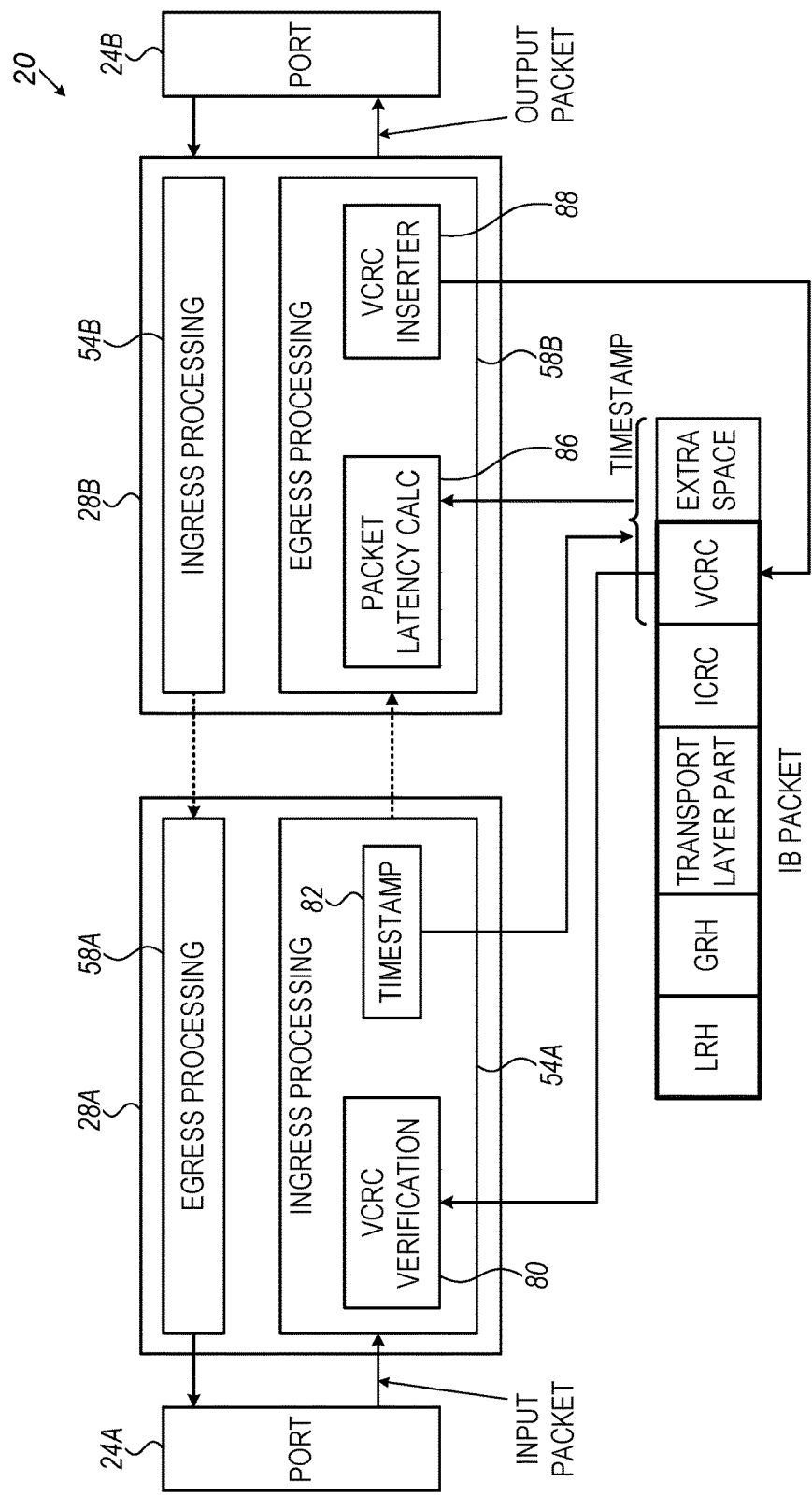
FIG. 2 is a diagram that schematically illustrates packet ingress processing and egress processing for measuring the packet traversal latency, in accordance with an embodiment that is described herein.

FIG. 2 is a diagram that schematically illustrates packet ingress processing and egress processing for measuring the packet traversal latency, in accordance with an embodiment that is described herein. In the present example we assume that switch 20 operates in an Infiniband switch fabric.

In FIG. 2, an input packet arriving from the network via port 24A undergoes ingress processing by packet processing module 28A. In addition, before exiting back to the network via port 24B, the packet undergoes egress processing by packet processing module 28B. The details of packet routing through fabric 46, as well as buffering or queuing, are omitted from the figure for clarity and are represented by the dashed arrows.

As depicted in FIG. 2, each of packet processing modules 28 comprises an ingress processing module 54 and an egress processing module 58. For clarity, the details of only ingress processing module 54A and of egress processing module 58B are depicted in FIG. 2.

The structure of an IB packet in an Infiniband network is depicted at the lower part of FIG. 2. The IB packet comprises various header and payload fields as described herein. A Local Route Header (LRH) field comprises a 16-bit Local ID (LID) that uses for addressing within IB subnets. The LRH field contains a Virtual Lane (VL) field whose value is an integer that specifies the VL to which the packet belongs. The VL is used for managing quality of service, as well as is some routing processes, and may change from hop to hop.

A Global Route Header (GRH) field serves for routing packets between IB subnets. The GRH field contains a 128-bit IPv6 address of the packet source and destination. The transport layer part of the IB packet contains a payload field and other fields that are required for managing the transport layer flow (these details are omitted from the figure for clarity).

In Infiniband, data integrity is verified using two Cyclic Redundancy Check (CRC) fields, namely an Invariant CRC (ICRC) and a Variant CRC (VCRC). The 16-bit VCRC field is calculated over all the fields of the IB packet and is recalculated at each hop. The 32-bit ICRC is calculated over only the fields of the IB packet that do not change from hop to hop. The VCRC field provides link-level data integrity between hops, and the ICRC provides end-to-end data integrity.

When the input packet arrives at the ingress processing module, the ingress processing module reads the current time from counter 52, and sets a corresponding input timestamp 82 that is indicative of the packet's time of arrival. In the present example, the input timestamp has a 32-bit resolution. Alternatively, any other timestamp resolution can also be used.

In some embodiments, input timestamp 82 is determined at the physical layer, and sent to the link layer, e.g., via a suitable descriptor along with the packet. In such embodiments, the overall latency includes the latency contributed by the physical layer processing.

Ingress processing module 54 comprises a VCRC verification module 80, which calculates a CRC over the input packet and compares this CRC with the value in the VCRC field. When the calculated CRC and the value in the VCRC field differ, the ingress processing module typically drops the packet. Otherwise, i.e., if the CRC calculated for the input packet matches the CRC value in the VCRC field, the ingress processing module overwrites the VCRC field with input timestamp 82. This overwriting is possible because the VCRC value is no longer needed after it was verified. Note that in the present example, the 32-bit timestamp requires a larger storage space than the 16-bit VCRC field in the packet, and therefore the timestamp extends the packet with extra storage space of 16 bits (denoted "EXTRA SPACE" in the figure). In other embodiments, the size of the timestamp may be smaller than or equal to the size of the VCRC field, in which case no extra storage space is required for the timestamp. For example, Ethernet packets use a 32-bit CRC, which equals the size of a 32-bit timestamp.

Egress processing module 58 comprises a packet latency calculator 86 and a VCRC insertor 88. When the packet is scheduled for transmission to the network, the egress processing module reads counter 52 to produce an output timestamp indicative of the packet departure time. Latency calculator 86 then estimates the packet latency by calculating the difference between the output timestamp and the input timestamp replacing the VCRC field in the packet. VCRC insertor 88 calculates a 16-bit CRC over the packet, in accordance with the Infiniband specifications, (excluding the extra 16-bit space used for the timestamp) and writes the resulting CRC in the VCRC field to produce a deliverable output packet. Egress processing module 58A then sends the packet to the network via port 24B.

Determining the packet arrival and departure times can be done in various ways in different embodiments. For example, the packet processing module may determine the packet arrival time after the packet is fully received and before checking the packet data integrity, when storing the packet at an ingress queue, or at any suitable instance in between. The packet processing module may determine the packet departure time, for example, when the packet is scheduled for transmission, when actual packet transmission begins, or at any suitable time in between.

In the context of the present disclosure and in the claims, the event "reception at the ingress interface" represents the time of packet arrival, and the event "transmission via a selected egress interface" represents the packet departure time.

In the example of FIG. 2, the packet comprises an IB packet whose data integrity is verified using the VCRC and ICRC fields. In other embodiments, the packet may be protected using any other suitable Error Detection Code (EDC) such as a single CRC having any suitable length, or any other suitable code that detects one or more erroneous bits in the packet. Further alternatively, the packet may be protected using an Error Correction Code (ECC) that corrects one or more bits in the packet. In the context of the present patent application and in the claims, the term EDC refers to any code that serves for detecting and/or correcting errors in the packet.

The switch and packet processing configurations shown in FIGS. 1 and 2 are example configurations, which are chosen purely for the sake of conceptual clarity. In alternative embodiments, any other suitable switch and/or packet processing configurations can also be used. For example, although the embodiments described herein refer mainly to network switches, the disclosed techniques can be implemented in various other types of network elements such as routers.

Certain switch elements may be implemented using hardware/firmware, such as using one or more Application-Specific Integrated Circuits (ASICs) or Field-Programmable Gate Arrays (FPGAs). Alternatively, some switch elements may be implemented in software or using a combination of hardware/firmware and software elements.

In some embodiments, certain switch functions, such as certain functions of switch controller 50, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although in the embodiments of FIGS. 1 and 2 calculating the packet latency is carried out by packet processing modules 28, in alternative embodiments packet latency is calculated by switch controller 50, in which case the switch controller is configured to read time counter 52.

As noted above, the switch comprises multiple ports and other elements. In the description that follows and in the claims, the term "circuitry" refers to all the elements of the switch excluding the ports. In the example of FIGS. 1 and 2, the circuitry comprises packet processing modules 28, buffer 32, switch fabric 46 and switch controller 50 of switch 20.

Figure 3:
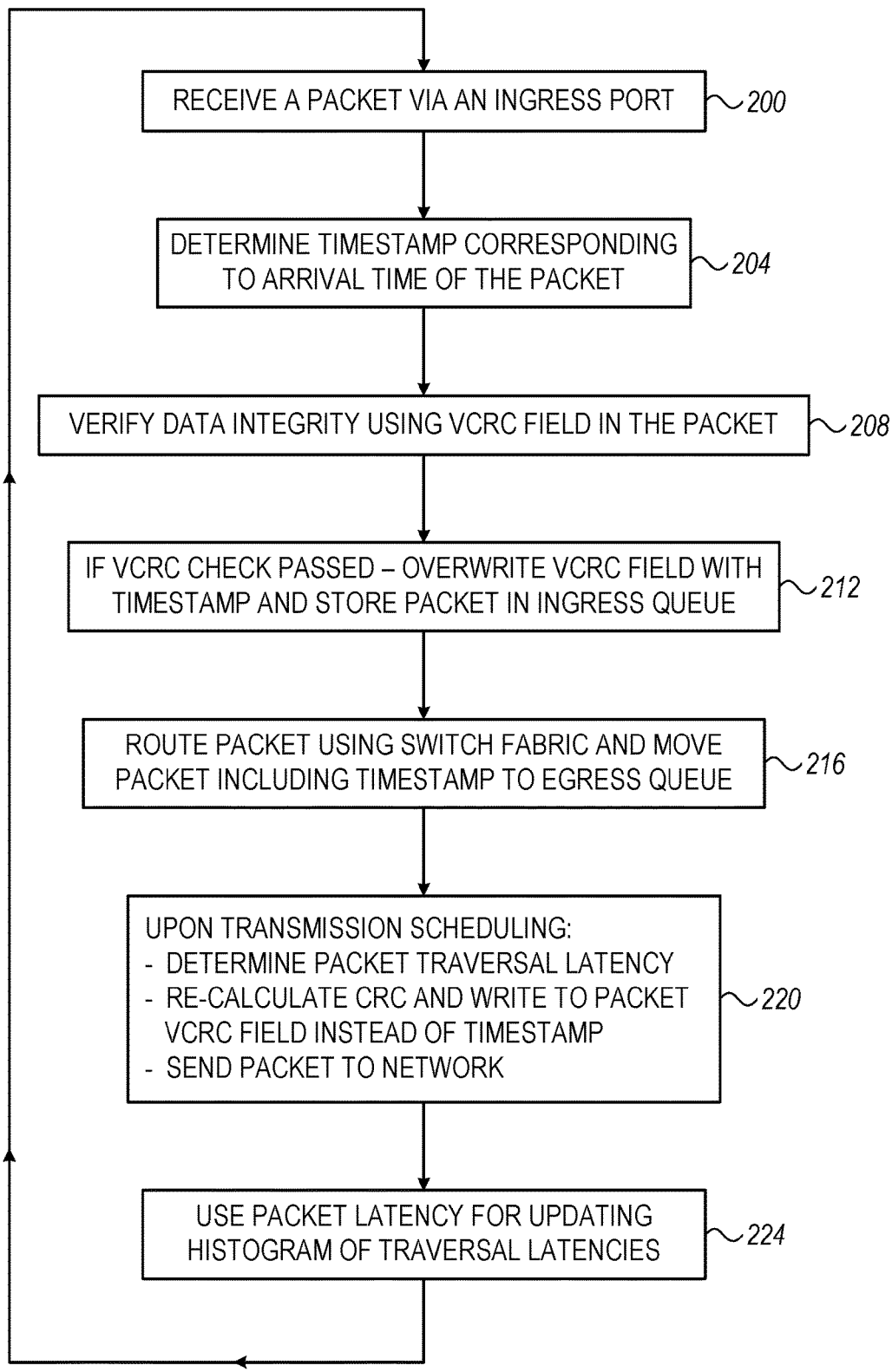
FIG. 3 is a flow chart that schematically illustrates a method for measuring packet traversal latency in a network switch, in accordance with an embodiment that is described herein.

FIG. 3 is a flow chart that schematically illustrates a method for measuring packet traversal latency in a network switch, in accordance with an embodiment that is described herein. The method can be executed, for example, by switch 20.

The method begins with switch 20 receiving a packet from the network via a certain ingress port, at a reception step 200. Upon receiving the packet, packet processing module 28 serving the ingress port determines an input timestamp corresponding to the arrival time of the packet, by reading the current time from counter 52, at an input time measurement step 204. VCRC verification module 80 checks the integrity of the received packet based on the packet's VCRC field, as described above, at a verification step 208.

At a timestamp saving step 212, if the data integrity check of step 208 has passes successfully, the packet processing module overwrites the VCRC field of the packet with the input timestamp determined at step 204, and stores the packet, including the timestamp, in an ingress queue 34. In the present example, the timestamp comprises 32 bits and the VCRC comprises only 16 bits, and therefore 16 extra bits are allocated in the queue for the packet.

In alternative embodiments, i.e., in networks other than IB, a suitable EDC other than VCRC can also be used. In general, the number of bits in the timestamp can be smaller than, equal to, or larger than the EDC field. In cases in which the size of the timestamp is larger than the size of the EDC field, extra space is allocated for queueing the packet.

At a routing step 216, the switch routes the packet from the ingress queue to a selected egress queue in accordance with the routing scheme configured in switch fabric 46. At preparation for transmission step 220, upon scheduling the packet for transmission, the packet processing module of the egress port determines the traversal latency of the packet as described herein. Egress processing module 58 of the egress port reads the current time from counter 52 as a corresponding output timestamp for the packet.

Egress processing module 58 estimates the traversal latency for the packet by calculating the difference between the output timestamp, and the input timestamp attached to the packet. Further at step 220, the egress processing module calculates a CRC over the packet fields, and writes the resulting CRC value in the VCRC field of the packet (overwriting at least a portion of the input timestamp that is no longer needed). The packet is then ready for transmission and the egress processing module sends the packet to the network.

In some embodiments, switch controller 50 derives a histogram of packet latency measurements. In some embodiments, the switch controller is configured to derive the histogram for selected packets, such as packets belonging to certain data flows, packets received or sent via certain ports, or using any other suitable selection criterion. At a histogram updating step 224, the switch controller uses the packet latency estimated at step 220 for updating the histogram. The method then loops back to step 200 to receive subsequent packets from the network.

The embodiments described above are given by way of example, and alternative suitable embodiments can also be used. For example, although the disclosed embodiments were described with reference to an IB switch, the disclosed techniques are applicable mutatis mutandis to other types of packet networks and network elements.

As another example, in some embodiments, in processing and routing the packet, the network element may change the value of a given field in the packet, such as, for example a Virtual Lane (VL) field that specifies a VL to which the packet belongs. In this embodiment, the switch calculates the EDC for preparing the packet for transmission after the field in question has been changed. Since after the CRC of the ingress packet is verified the packet headers may change, the CRC needs to be recalculated. The module that is used for CRC verification can also be used for recalculating the CRC for packet transmission.

Although the embodiments described above refer mainly to network elements such as switches and routers, the disclosed techniques apply also to Network Interface Controllers (NICs), which process ingress and egress packets similarly to network switches.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   multiple interfaces, which are configured to connect to a communication system; and
   circuitry, which is configured to:
      receive via an ingress interface a packet that comprises an Error Detection Code (EDC) field comprising an input EDC value;
      determine an input timestamp indicative of a time-of-arrival of the received packet at the network element, and write the input timestamp to replace at least part of the input EDC value in the EDC field of the packet;
      estimate for the packet a traversal latency between reception at the ingress interface and transmission via a selected egress interface, based at least on the input timestamp;
      calculate an output EDC value over one or more fields of the packet, excluding the EDC field in which the timestamp was written; and
      produce a deliverable version of the packet by writing the calculated output EDC value to the EDC field, instead of the timestamp, and send the deliverable version of the packet via the selected egress interface.

2. The network element according to claim 1, wherein the network element comprises a switch in an Infiniband network, wherein the EDC field comprises a Variant Cyclic Redundancy Check (VCRC) field, and wherein the circuitry is configured to evaluate an EDC value over the one or more fields of the received packet, and to produce the output EDC value over the packet to be sent, in accordance with an Infiniband specification.

3. The network element according to claim 1, wherein the input timestamp requires a storage space larger than the EDC field, and wherein the circuitry is configured to write the input timestamp to replace the at least part of the input EDC value, by allocating for the received packet a storage space larger than required for storing the received packet with the EDC field.

4. The network element according to claim 1, wherein the circuitry is configured to estimate the traversal latency, by determining an output timestamp indicative of a time-of-departure of the packet to the communication system via the selected egress interface, and calculating a difference between the output timestamp and the input timestamp.

5. The network element according to claim 1, wherein the circuitry is configured to produce the deliverable version of the packet by changing a value of a given field in the packet, and to evaluate the output EDC value after the given field has been changed.

6. The network element according to claim 5, wherein the given field comprises a Virtual lane (VL) field in accordance with an Infiniband specification.

7. The network element according to claim 1, wherein the circuitry is configured to derive a histogram of traversal latencies from multiple packets received via ingress interfaces of the network element, and to update the histogram using the estimated traversal latency of the packet.

8. A method, comprising:
   receiving via an ingress interface of a network element that comprises multiple interfaces for connecting to a communication system, a packet that comprises an Error Detection Check (EDC) field comprising an input EDC value;
   determining an input timestamp indicative of a time-of-arrival of the received packet at the network element, and writing the input timestamp to replace at least part of the input EDC value in the EDC field of the packet;
   estimating for the packet a traversal latency between reception at the ingress interface and transmission via a selected egress interface, based at least on the input timestamp;
   calculating an output EDC value over one or more fields of the packet, excluding the EDC field in which the timestamp was written; and
   producing a deliverable version of the packet by writing the calculated output EDC value to the EDC field, instead of the timestamp, and sending the deliverable version of the packet via the selected egress interface.

9. The method according to claim 8, wherein the network element comprises a switch in an Infiniband network, wherein the EDC field comprises a Variant Cyclic Redundancy Check (VCRC) field, and further comprising evaluating an EDC value over the one or more fields of the received packet, and producing the output EDC value over the packet to be sent, in accordance with an Infiniband specification.

10. The method according to claim 8, wherein the input timestamp requires a storage space larger than the EDC field, and wherein writing the input timestamp to replace the at least part of the input EDC value comprises allocating for the received packet a storage space larger than required for storing the received packet with the EDC field.

11. The method according to claim 8, wherein estimating the traversal latency comprises determining an output timestamp indicative of a time-of-departure of the packet to the communication system via the selected egress interface, and calculating a difference between the output timestamp and the input timestamp.

12. The method according to claim 8, wherein producing the deliverable version of the packet comprises changing a value of a given field in the packet, and evaluating the output EDC value after the given field has been changed.

13. The method according to claim 12, wherein the given field comprises a Virtual lane (VL) field in accordance with an Infiniband specification.

14. The method according to claim 8, and comprising deriving a histogram of traversal latencies from multiple packets received via ingress interfaces of the network element, and updating the histogram using the estimated traversal latency of the packet.

* * * * *